(12) United States Patent
Lee et al.

(10) Patent No.: US 7,817,411 B2
(45) Date of Patent: Oct. 19, 2010

(54) DISPLAY DEVICE WITH DOCUMENT HOLDING FUNCTION

(75) Inventors: Shi-Hung Lee, Tao Yuan Shien (TW); Ho-Sheng Lin, Tao Yuan Shien (TW)

(73) Assignee: Quanta Computer Inc., Tao Yuan Shien (TW)

( * ) Notice: Subject to any disclaimer, the term of this patent is extended or adjusted under 35 U.S.C. 154(b) by 428 days.

(21) Appl. No.: 11/984,149

(22) Filed: Nov. 14, 2007

(65) Prior Publication Data

US 2009/0079181 A1    Mar. 26, 2009

(30) Foreign Application Priority Data

Sep. 26, 2007   (TW) ............................... 96216066 U

(51) Int. Cl.
*H05K 5/00* (2006.01)
*H05K 7/00* (2006.01)

(52) U.S. Cl. ..................... 361/679.25; 349/58; 248/442; 248/447

(58) Field of Classification Search ............ 361/679.25; 349/58; 248/442, 447
See application file for complete search history.

(56) References Cited

U.S. PATENT DOCUMENTS 5,292,099 A * 3/1994 Isham et al. .............. 248/442.2
6,771,329 B2 * 8/2004 Hung et al. .................... 349/58

* cited by examiner

*Primary Examiner*—Jayprakash N Gandhi
*Assistant Examiner*—Anthony M Haughton
(74) *Attorney, Agent, or Firm*—Rabin & Berdo, PC

(57) ABSTRACT

A display device with a document holding function includes a main body and an elongated rod. The elongated rod, which is pivotally connected to an edge of the main body, is swiveled relative to the main body, and selectively laid against or perpendicular to the edge of the main body. A curved wall extends from the elongated rod. A curved clip is pivotally connected to the elongated rod, and rotatable to be selectively laid against or away from the curved wall. When the curved clip is laid against the curved wall, a document is clamped between the curved clip and the curved wall.

18 Claims, 6 Drawing Sheets

DISPLAY DEVICE WITH DOCUMENT HOLDING FUNCTION

RELATED APPLICATIONS

This application claims priority to Taiwan Application Ser. No. 96216066, filed Sep. 26, 2007, which is herein incorporated by reference.

BACKGROUND

1. Field of Invention

The present invention relates to a display device with a document holding function.

2. Description of Related Art

As computer technology advances rapidly and computer price gets cheaper, computer has become an essential tool for a modern person. A common computer is at least equipped with word processing software such that it can be extensively used in general houses or offices. Moreover, portable computers, i.e. notebook computers, are used widely instead of desktop computers. When users deal with paper work, he or she may needs a document holder accompanying a notebook computer to enhance work efficiency. A conventional document holder needs to be installed on a display panel of a notebook computer when users need it to deal with paper work. And the document holder needs to be removed from the display panel after paper work is done. Therefore, it is somewhat inconvenient for users to install and uninstalled the document holder repeatedly.

In addition, users may buy a luxurious notebook computer with aesthetic coating on all its housing. Installing or uninstalling the document holder repeatedly may damage the aesthetic coating on the housing of the notebook computer.

For the forgoing reasons, there is a need for a computer or its display device to equip with a built-in document holder.

SUMMARY

It is therefore an objective of the present invention to provide display device with a document holding function In accordance with the foregoing and other objectives of the present invention, a display device with a document holding function includes a main body and an elongated rod. The main body has a display screen. The elongated rod, which is pivotally connected to an edge of the main body, is swiveled relative to the main body, and selectively laid against or perpendicular to the edge of the main body. A curved wall extends from the elongated rod. A curved clip is pivotally connected to the elongated rod, and rotatable to be selectively laid against or away from the curved wall. When the curved clip is laid against the curved wall, a document is clamped between the curved clip and the curved wall.

It is to be understood that both the foregoing general description and the following detailed description are by examples, and are intended to provide further explanation of the invention as claimed.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention. In the drawings.

DESCRIPTION OF THE PREFERRED EMBODIMENTS

Figure 1:
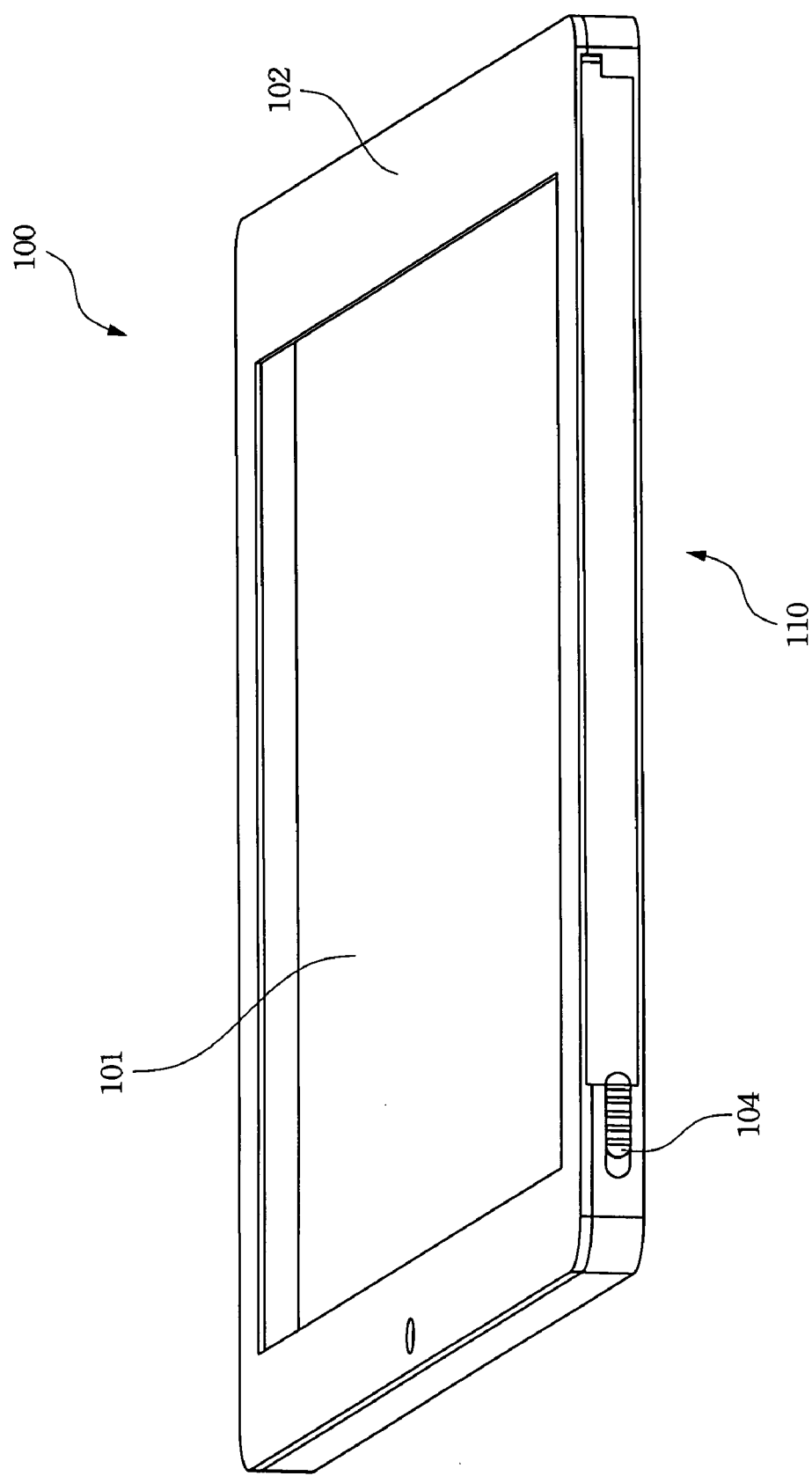
FIG. 1 illustrates a display device with a document holder according to one embodiment as described herein.

Reference will now be made in detail to the present preferred embodiments of the invention, examples of which are illustrated in the accompanying drawings. Wherever possible, the same reference numbers are used in the drawings and the description to refer to the same or like parts.

FIG. 1 illustrates a display device with a document holder according to one embodiment as described herein. The display device 100 has a rectangular main body 102, which includes a display screen 101. A document holder 110 is installed at one side of the main body 102. When the document holder 110 is laid against the main body 102, a fastener 104 may be used to secure an end of the document holder 110 such that the document holder 110 can be properly secured and laid against the main body 102 before the display device 100 being conveniently carried. As illustrated in FIG. 1, the document holder 110 is dimensioned to be integrated as part of the edge of the main body 102 when the document holder 110 is laid against the edge of the main body 102 and secured by the fastener 104.

Figure 2:
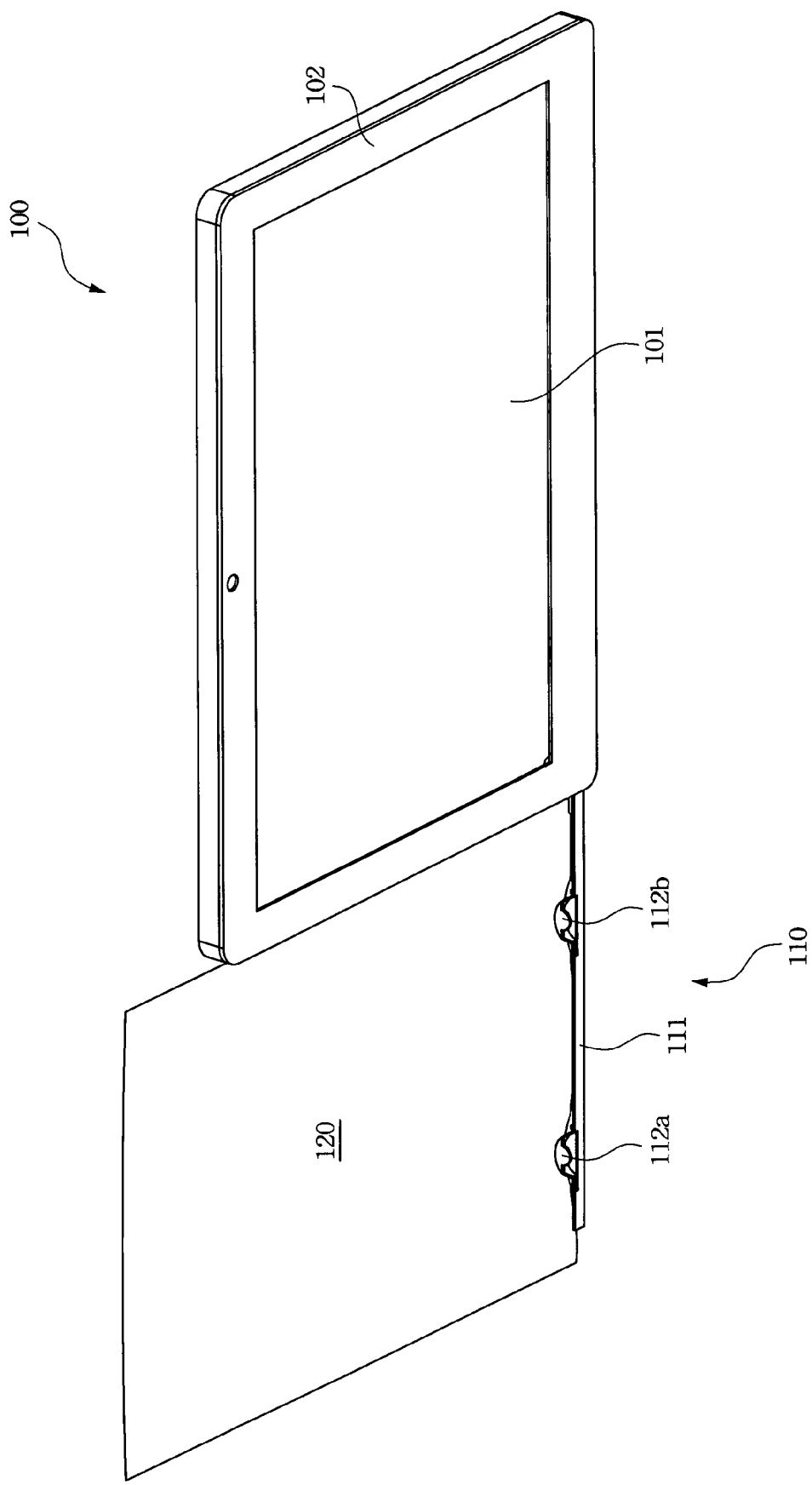
FIG. 2 illustrates the display device as illustrated in FIG. 1 with the document holder clamping a document thereon.

FIG. 2 illustrates the display device as illustrated in FIG. 1 with the document holder clamping a document thereon. The document holder 110 has an elongated rod 111, which is pivotally connected to an edge or corner of the main body 102. The elongated rod 111 is swiveled relative to the main body 102 such that the elongated rod 111 can be selectively laid against the main body 102 (as illustrated in FIG. 1) or perpendicular to the main body 102 (as illustrated in FIG. 2). In present embodiment, the elongated rod 111 is pivotally connected to either one of two bottom corners of the main body 102 when the main body 102 is held with its display screen 101 substantially in parallel with the gravitational force of Earth. A document 120 is slightly curved when a bottom edge of the document 120 is clamped on an upper surface of the elongated rod 111. Therefore, the document 120 can be held upright without other upper edges being clamped.

Figure 3:
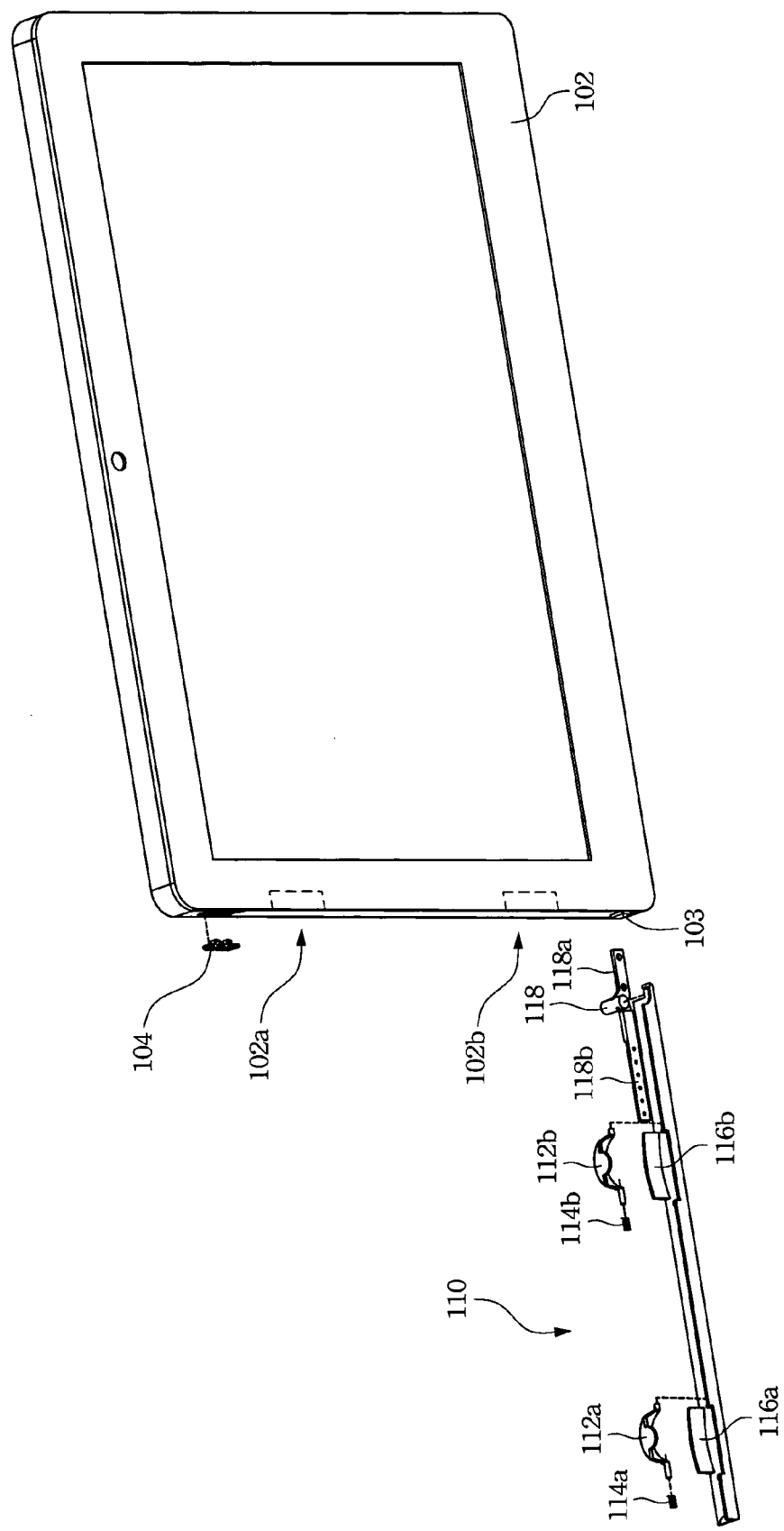
FIG. 3 illustrates an exploded view of the display device as illustrated in FIG. 1.

FIG. 3 illustrates an exploded view of the display device as illustrated in FIG. 1. The elongated rod 111 is pivotally connected to a position 103 of the main body 102 by a joint 118. The joint 118 includes joint members 118a and 118b, which are rotatably connected with each other. The joint member 108a is screwed on the position 103 of the main body 102, and the joint member 108 is fastened on the elongated rod 111. In present embodiment, two curved walls 116a/116b extend upwards from an upper surface of the elongated rod 111. Two curved clips 112a/112b, are respectively installed adjacent to its corresponding curved walls 116a/116b, and pivotally connected with elongated rod 111. Two curved walls 116a/116b both have a concave surface 117 (as illutrated in FIG. 6), which facec its corresponding curved clips 112a/112b. When the curved clips 112a /112b are laid against the concave surface 117 of the curved walls 116a/116b, a document 120 is clamped between the curved clips 112a/112b, and the curved walls 116a/116b (as illustrated in FIG. 2). The main body 102 further includes two concave sections 102a/102b at its edge, which are used to accommodate curved walls 116a/116b and curved clips 112a/112b when the elongated rod 111 is laid against the main body 102.

Figure 4:
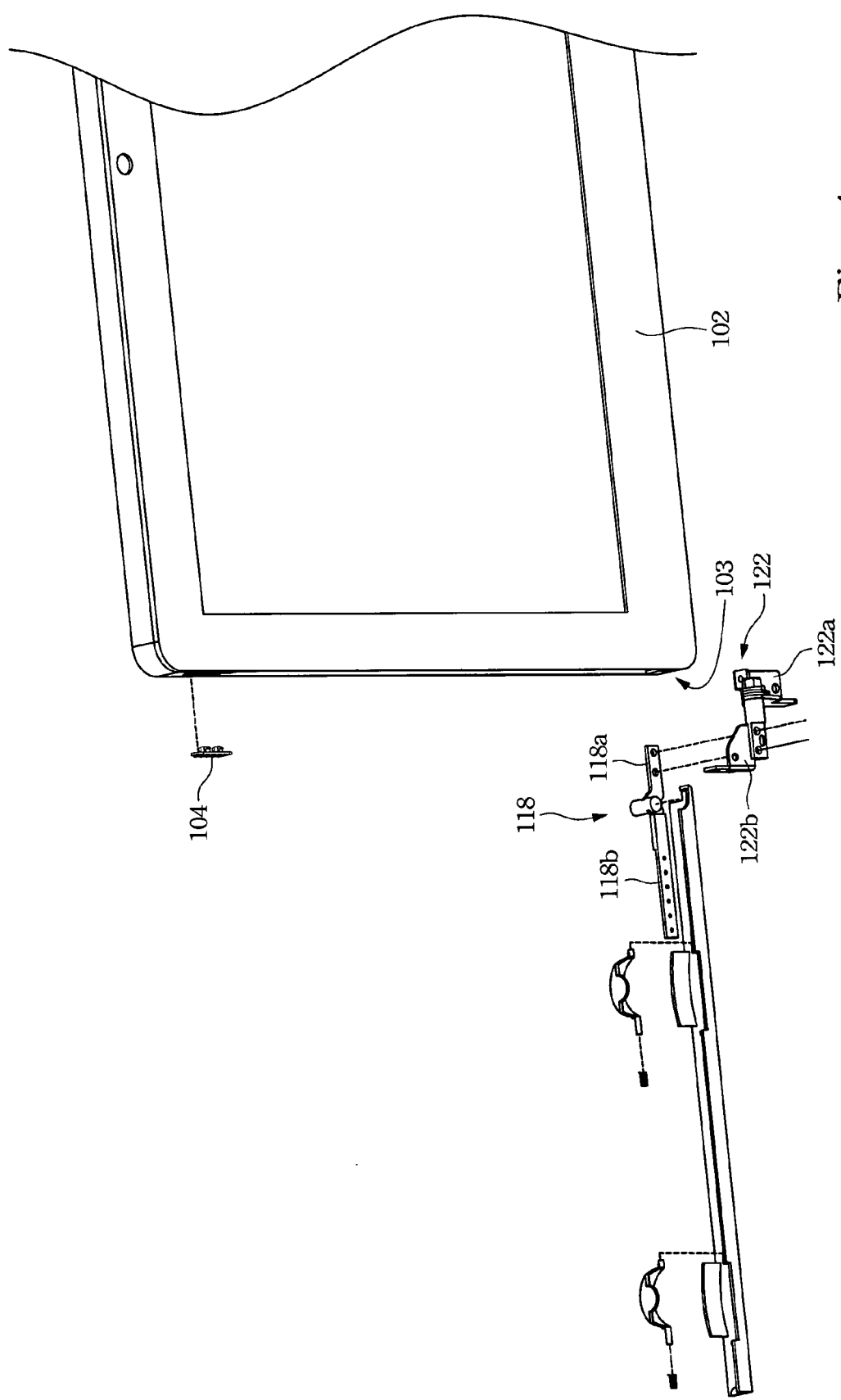
FIG. 4 illustrates an exploded view of a display device according to another embodiment as described herein.
Figure 5:
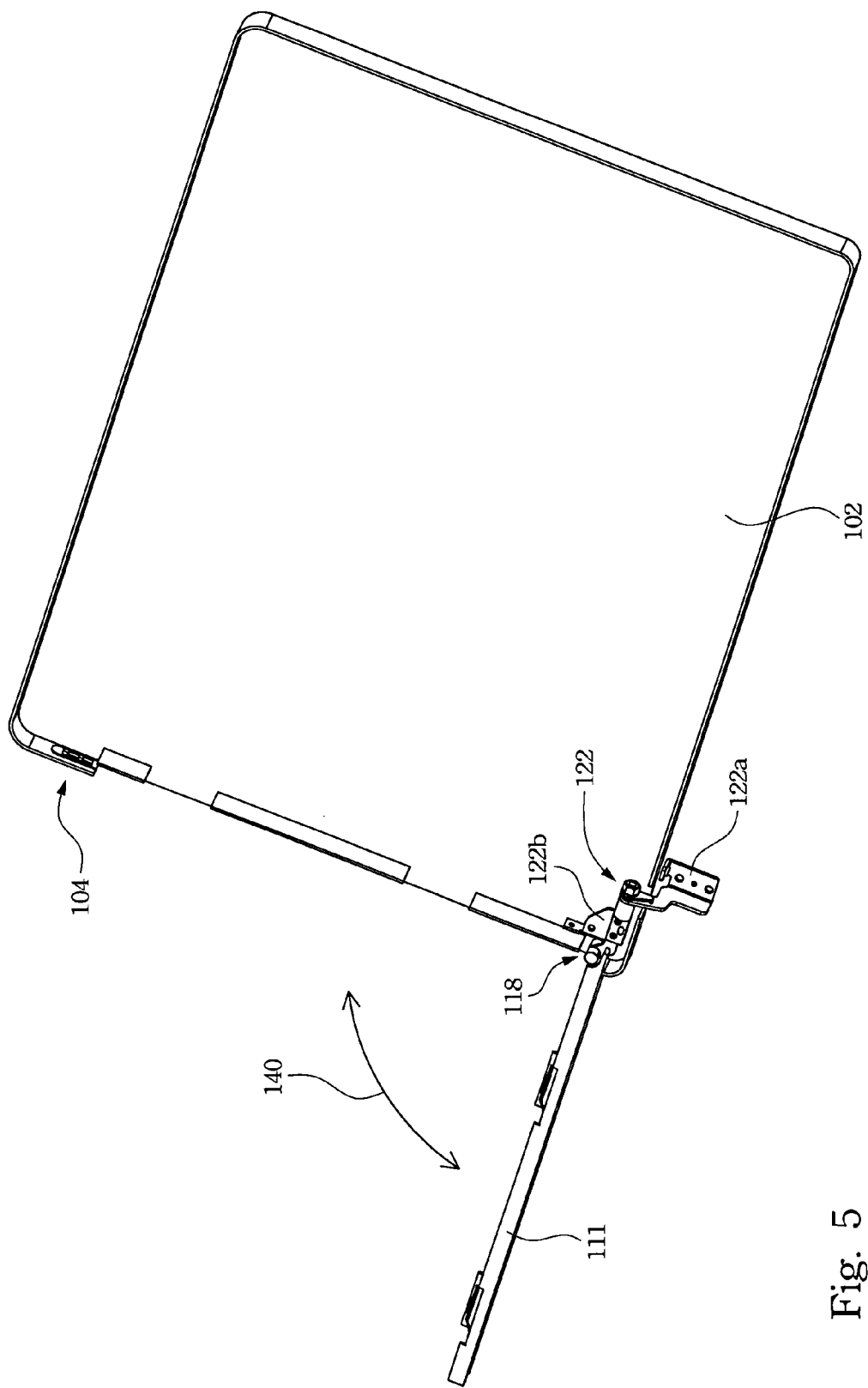
FIG. 5 illustrates an assembled view of the display device as illustrated in FIG. 4.

FIG. 4 illustrates an exploded view of a display device according to another embodiment as described herein. Present embodiment further includes a joint 122 comparing to the embodiment as illustrated in FIG. 3. The joint 122 includes joint members 122a and 122b, which are rotatably connected with each other. In present embodiment, the joint member 118a is first screwed on the joint member 122b, and both are then screwed on the position 103 of the main body 102. The joint member 122a is screwed on a main frame of a notebook computer or any support member. FIG. 5 illustrates an assembled view of the display device where the elongated rod 111 is connected to the main body 102 by the joint 118 and 122 (part of the main body 102's housing is removed). The elongated rod 111 can be swiveled along the direction 140, and laid against or perpendicular to the main body 102. The main body 102 can be swiveled relative to a main frame of a notebook computer by the joint 122.

Figure 6:
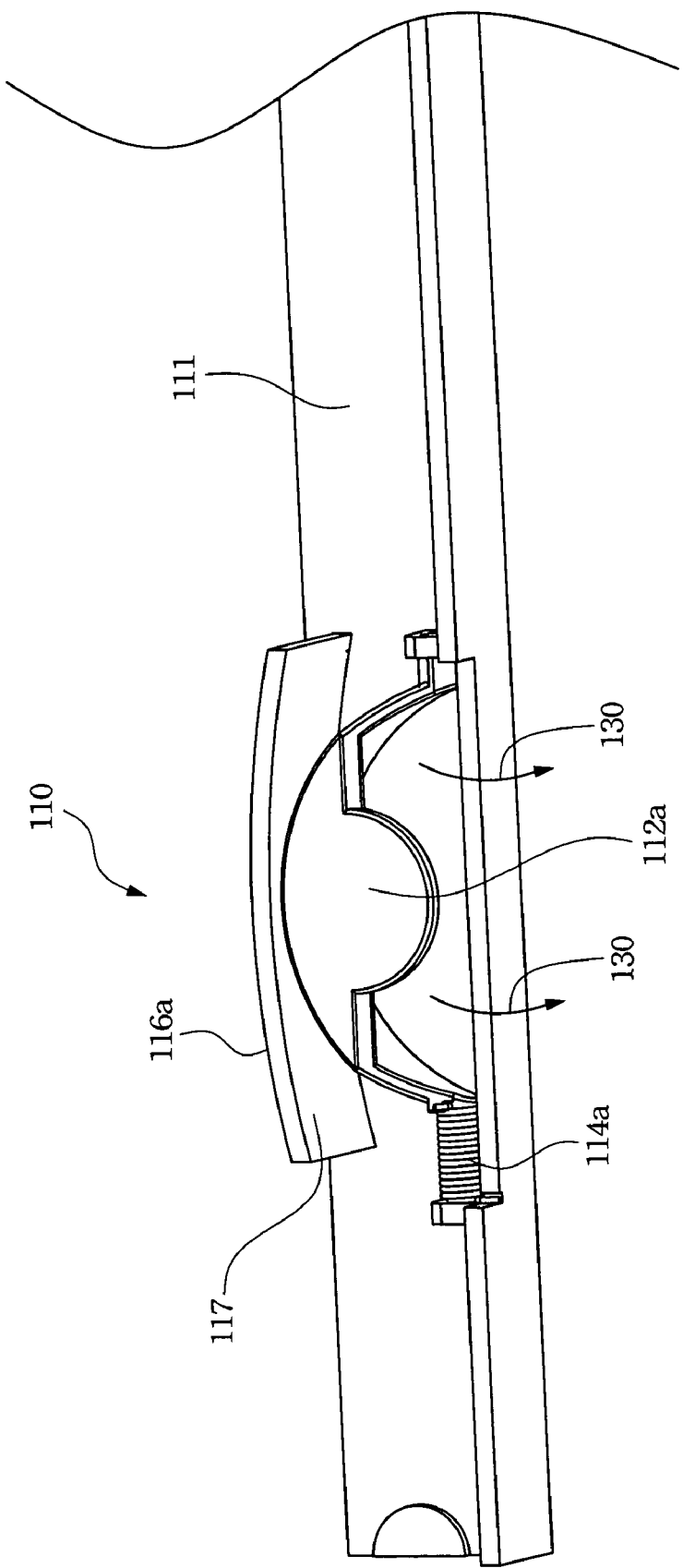
FIG. 6 illustrates an enlarged portion of the document holder.

FIG. 6 illustrates an enlarged portion of the document holder. As stated above, a document is clamped between the curved clip 112a and the curved wall 116a when the curved clip 112a is laid against the curved wall 116a. Two end portions of the curved clip 112a are pivotally connected with the upper surface of the elongated rod 111. The curved clip 112a is persistently laid against the concave surface 117 of the curved wall 116a due to a rebound force of the torsion spring 114a (installed around the end portions of the curved clip 112a). When a document needs to be removed or put in, the curved clip 112a can be pulled away from the concave surface 117 of the curved wall 116a along a direction 130. When no force is applied to pull the curved clip 112a, the curved clip 112a rebounds back and is laid against the concave surface 117 of the curved wall 116a.

According to embodiments discussed above, the display device in present disclosure is equipped with a document holder such that users may conveniently use the document holder to process any paper work at anytime.

The term "substantially" as used herein may be applied to modify any quantitative representation, which could permissibly vary without resulting in a change in the basic function to which it is related.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A display device with a document holding function, comprising:
 a main body comprising a display screen and an edge, wherein the edge comprises a curved;
 an elongated rod, which is pivotally connected to the edge of the main body, being swiveled relative to the main body, and is selectively laid against or perpendicular to the edge of the main body;
 a curved wall extending from the elongated rod;
 a curved clip pivotally being connected to the elongated rod, and rotatable around the elongated rod to be selectively laid against or away from the curved wall,
 wherein the concave section accommodates the curved wall and the curved clip when the elongated rod is laid against the edge of the main body, and
 a document is clamped between the curved clip and the curved wall when the curved clip is laid against the curved wall.

2. The display device of claim 1, further comprising a fastener, when the elongated rod is laid against the edge of the main body, the fastener secures an end of the elongated rod.

3. The display device of claim 1, wherein the curved wall comprises a concave surface, which faces the curved clip.

4. The display device of claim 3, further comprising a torsion spring to rebound the curved clip to be laid against the concave surface of the curved wall.

5. The display device of claim 3, wherein the document is clamped between the curved clip and the curved wall when the curved clip is laid against the concave surface of the curved wall.

6. The display device of claim 3, wherein the main body is of a rectangular shape, and the elongated rod is pivotally connected to a corner of the main body.

7. The display device of claim 6, wherein the elongated rod is pivotally connected to either one of two bottom corners of the main body when the main body is held with the display screen substantially in parallel with the gravitational force of Earth.

8. The display device of claim 7, wherein the curved wall is disposed on an upper side when the elongated rod is perpendicular to the edge of the main body.

9. The display device of claim 8, wherein the document is clamped between the curved clip and the curved wall when the curved clip is laid against the concave surface of the curved wall.

10. A display device comprising:
 a main body comprising a display screen and an edge, having a curved concave section;
 an elongated rod, which is pivotally connected to the edge of the main body, being swiveled relative to the main body, and is selectively laid against or perpendicular to the edge of the main body, wherein the elongated rod is dimensioned to be integrated as part of the edge of the main body when the elongated rod is laid against the edge of the main body;
 a curved wall extending from the elongated rod;
 a curved clip pivotally being connected to the elongated rod, and rotatable around the elongated rod to be selectively laid against or away from the curved wall,
 wherein a document is clamped between the curved clip and the curved wall when the curved clip is laid against the curved wall.

11. The display device of claim 10, further comprising a fastener, when the elongated rod is laid against the edge of the main body, the fastener secures an end of the elongated rod.

12. The display device of claim 10, wherein the curved wall comprises a concave surface, which faces the curved clip.

13. The display device of claim 12, further comprising a torsion spring to rebound the curved clip to be laid against the concave surface of the curved wall.

14. The display device of claim 12, wherein the document is clamped between the curved clip and the curved wall when the curved clip is laid against the concave surface of the curved wall.

15. The display device of claim 12, wherein the main body is of a rectangular shape, and the elongated rod is pivotally connected to a corner of the main body.

16. The display device of claim 15, wherein the elongated rod is pivotally connected to either one of two bottom corners of the main body when the main body is held with the display screen substantially in parallel with the gravitational force of Earth.

17. The display device of claim 16, wherein the curved wall is disposed on an upper side when the elongated rod is perpendicular to the edge of the main body.

18. The display device of claim 17, wherein the document is clamped between the curved clip and the curved wall when the curved clip is laid against the concave surface of the curved wall.

* * * * *